Patented June 7, 1927.

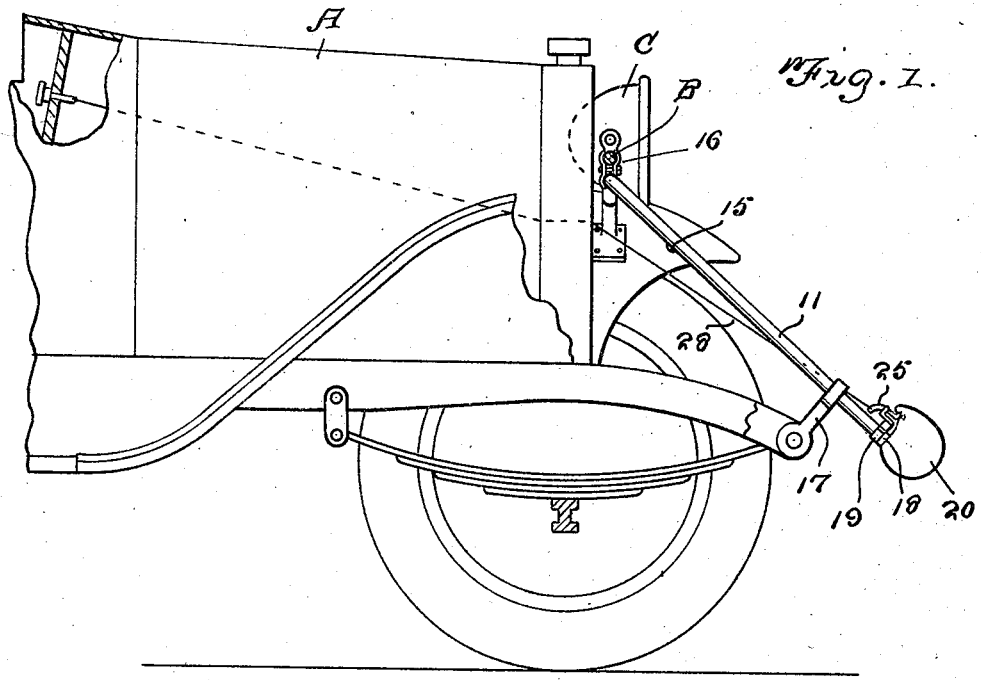
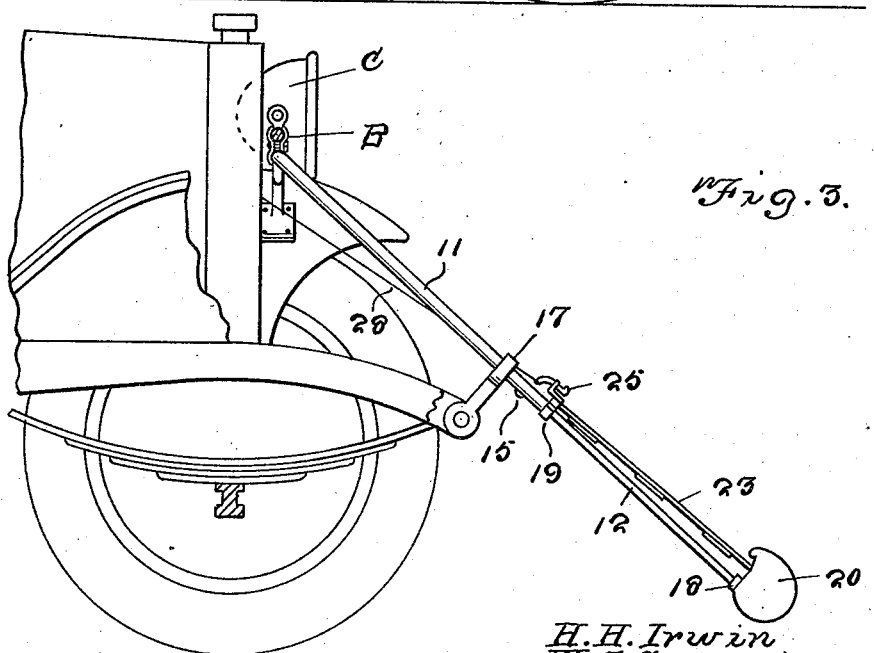

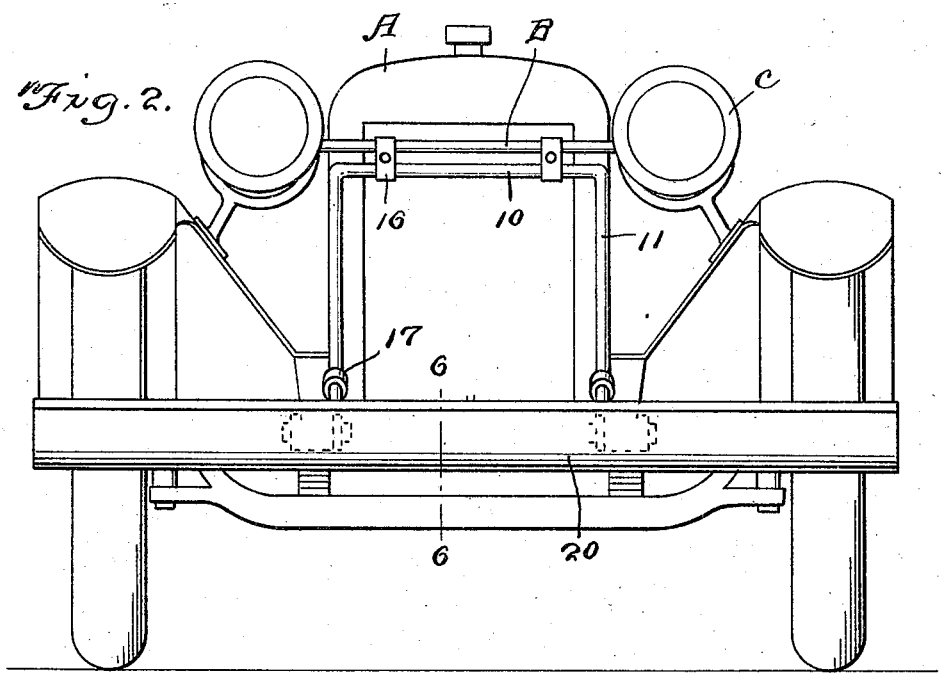
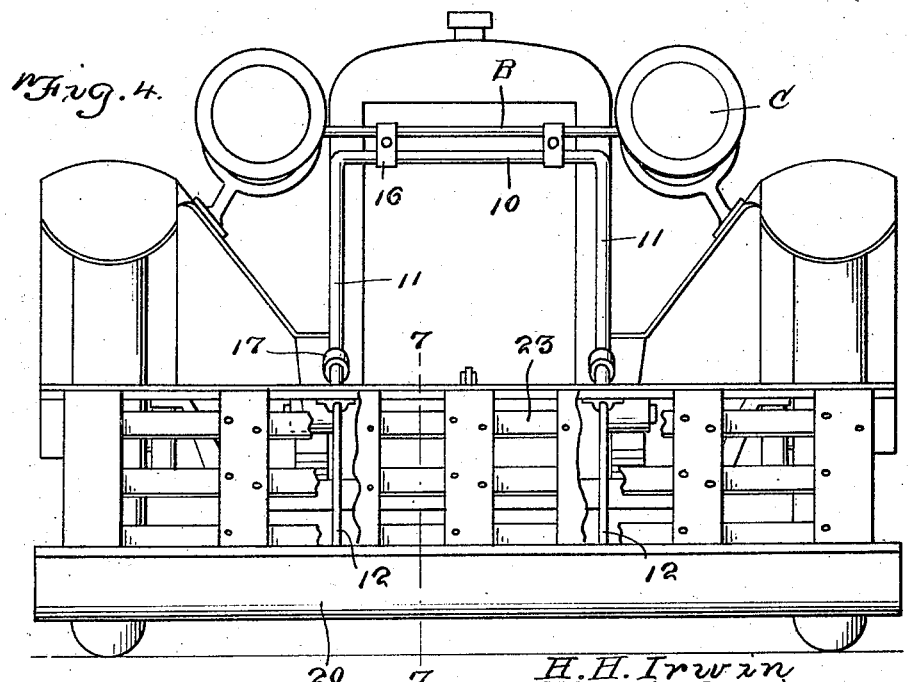

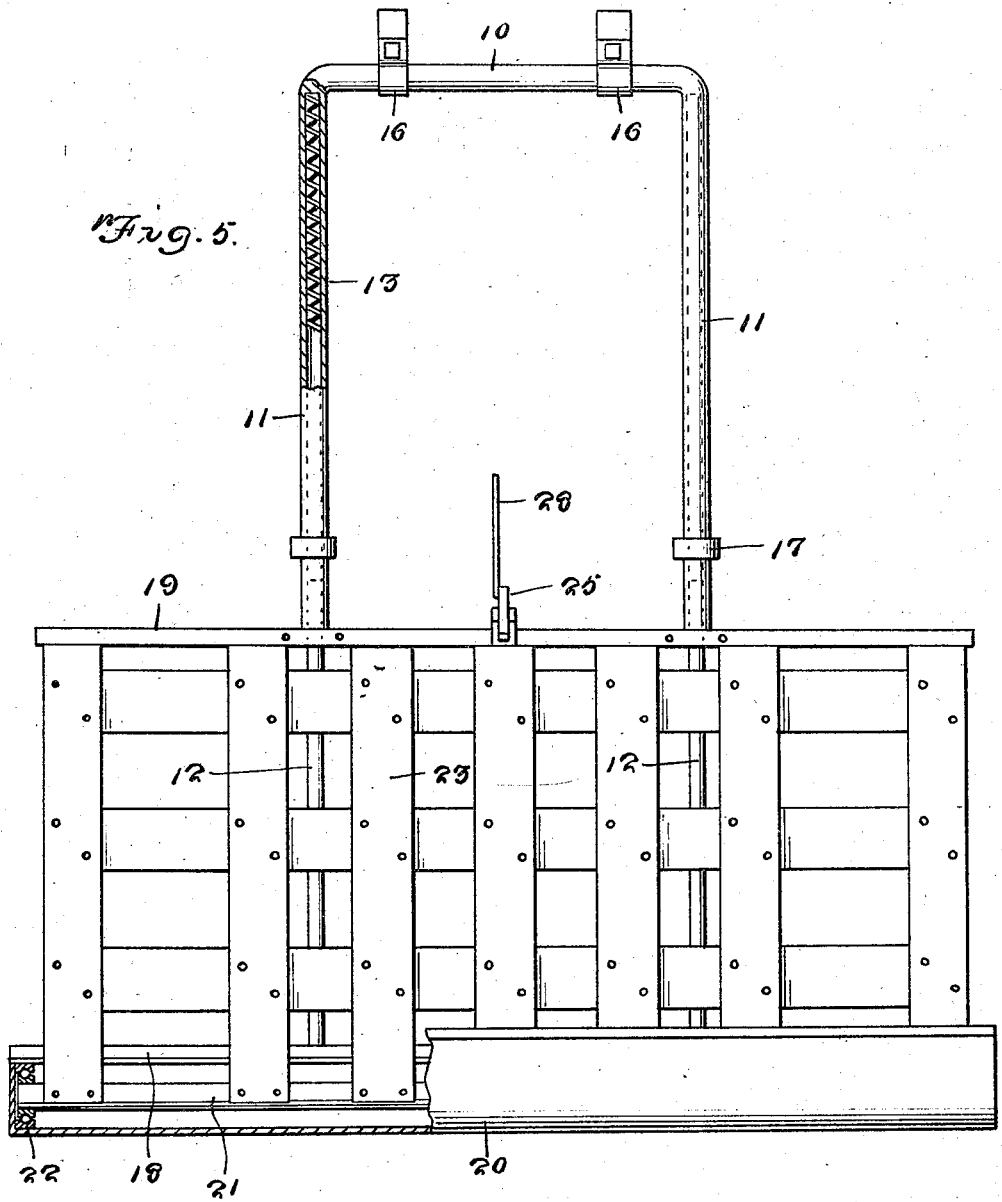

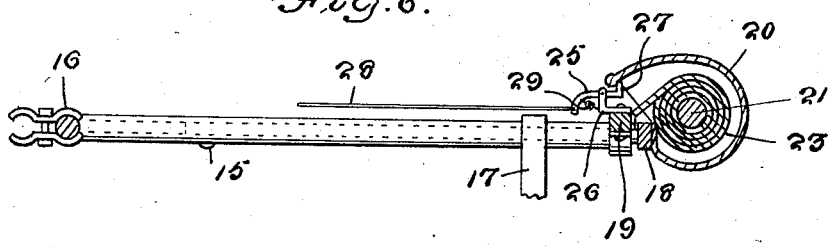
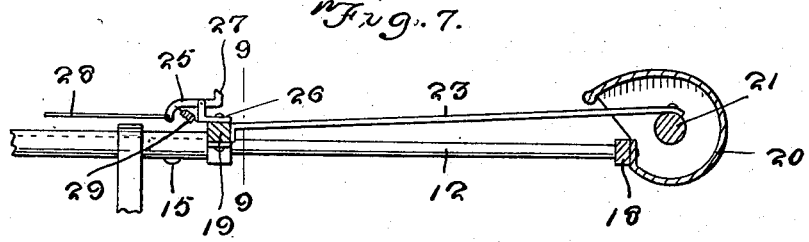
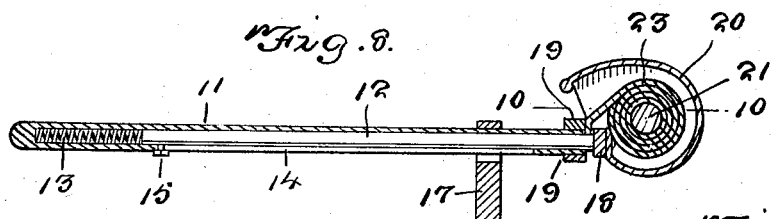
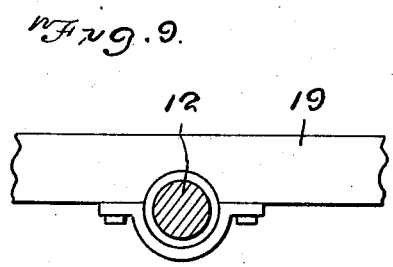
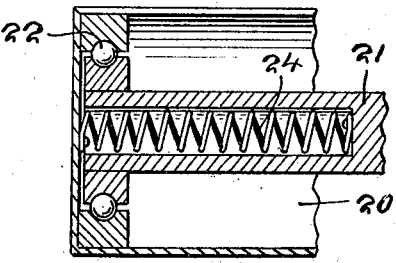

1,631,417

UNITED STATES PATENT OFFICE.

HENRY H. IRWIN AND WILLIAM ATTOR CARPENTER, OF GREENVILLE, SOUTH CAROLINA.

FENDER ATTACHMENT FOR AUTOMOBILES.

Application filed September 8, 1926. Serial No. 134,250.

This invention relates to motor operated vehicles, and has particular reference to an attachment therefor, which is in the nature of a normally collapsed fender, capable of being quickly extended in the direction of the ground, when its use is desired, the fender being designed to prevent injury to a person who might be struck by the machine, the person falling into the fender and supported thereby until the machine is brought to a stop.

In carrying out the invention we contemplate the use of a netting, which constitutes the body of the fender, and normally wound upon a suitable roll, and automatically unwound therefrom when its use is desired.

Another object of the invention resides in normally housing the roll and netting in a casing which extends across the front of the machine, and normally used in the capacity of a bumper.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a fragmentary side elevation of a motor operated vehicle showing the attachment applied thereto.

Figure 2 is a front elevation of the machine showing the attachment in the same position as illustrated in Figure 1.

Figure 3 is a view similar to Figure 1 but showing the fender extended for use.

Figure 4 is a front elevation taken at a right angle to Figure 3.

Figure 5 is a top plan view of the fender removed from the machine and partly shown in section.

Figure 6 is a sectional view on line 6—6 of Figure 2.

Figure 7 is a sectional view on line 7—7 of Figure 4.

Figure 8 is a transverse section through a part of the fender.

Figure 9 is a sectional view on line 9—9 of Figure 7.

Figure 10 is a sectional view on line 10—10 of Figure 8.

Referring to the drawings in detail A indicates generally a motor operated vehicle of ordinary well known construction, while B represents the brace rod connecting the head lamps C of the machine.

The attachment forming the subject matter of the present invention includes a substantially U-shaped frame 10, the parallel limbs 11 of which are hollow to telescopically receive rods 12, which are adapted to be projected from their normal inactive positions, to their active positions through the instrumentality of springs 13. These springs are arranged within the limbs 11 of the frame and bear against the adjacent ends of the rods 12 as clearly illustrated in Figure 8. Each limb is provided with a longitudinal slot 14, while a stop pin 15 is carried by each rod 12, and operates within the adjacent slot 14. The ends of the slot are adapted to be engaged by the pin 15, and serve to limit the movement of the rod in either direction. This frame is mounted upon the brace rod B above referred to by means of suitable clamps indicated at 16, while the frame is further braced and supported by brackets 17 rising from the forward end of the frame of the machine and designed to surround the limbs 11 as clearly illustrated.

Carried by the forward extremities of the rods 12 is a transverse bar 18, while connecting the forward ends of the limbs 11 is a similar bar 19. A substantially semi-cylindrical-shaped casing 20 is supported by the transverse bar 18, and journaled in this casing is a roller 21. The roller is mounted on ball bearings 22 in the manner illustrated in Figure 10, while normally wound about this roller is a netting 23. The roller 21 is provided with a spring 24 for winding the netting thereabout in a manner to be hereinafter described. One end of this netting is attached to the stationary transverse bar 19 carried by the limbs 11, so that when the rods 12 are projected from their normal positions shown in Figure 1, to their active positions illustrated in Figure 3, the netting 23 will be unwound from the roll, and thereby constitute the body of the fender, into which a person struck by the machine will fall, without injuring the person, and be supported thereby until the machine is brought to a stop. The frame projects downwardly at an angle from the front of the machine, and when the rods 12 are projected to their active positions, they form a continuity of the frame, so that the parts will be arranged in the manner shown in Figure 3, with the casing 20 terminating in close proximity to the ground. The netting 23 may be constructed from any suitable material and in any suitable manner without departing from the spirit of the invention.

As hereinabove stated the netting 23 is normally wound about the roll 21, and the rods 12 arranged in their retracted positions within the limbs 11 against the tension of the springs 13. These parts are held in this position by a pivoted latch 25 supported on a bracket 26 which is mounted on the transverse bar 19. The active extremity 27 of the latch is adapted to engage the adjacent end of a casing 20, while the other end of the latch is connected with an operating element 28 which extends in the direction of the driver's seat and arranged within convenient reach of the driver. The resilient element 29 normally holds the latch in the position just mentioned, and when it engages the casing 20, the latter is supported in a position to be used in the capacity of a bumper for the machine.

In practice the parts are normally arranged in the manner shown in Figures 1 and 2, and if the driver is about to strike a person with the machine, it is only necessary to pull upon the operating element 28, whereby releasing the casing 20 from the latch 25. Just as soon as this occurs, the springs 13 function to project the rods 12 to the positions illustrated in Figures 3 and 4, wherein the casing 20 is arranged in close proximity to the ground, while the netting 23 is unwound from the roller 21. This of course is due to the fact that one end of the netting is secured to the stationary transverse bar 19 carried by the limbs 11. Should the party be struck by the machine, he will fall into the netting without being injured, and be supported thereby until the machine is brought to a stop. When the rods 12 are returned to their normal positions, the spring 24 forming part of the roll 21 rewinds the netting about the latter.

While it is believed that from the foregoing description, the nature and advantages of the invention will be readily apparent, we desire to have it understood, that we do not limit ourselves to what is herein shown and described and that such changes may be resorted to when desired as fall within the scope of what is claimed.

What is claimed is:

1. An automobile attachment of the character described comprising a frame mounted on the front of a machine and including normally spaced limbs, rods slidably fitted in said limbs, a normally wound netting supported by said rods and having one end connected with said limbs, means for holding said rods normally in retracted positions, means for automatically projecting said rods when released and simultaneously unwind said netting, and manually operable means for releasing said rods for the purpose specified.

2. An automobile attachment of the character described comprising a frame mounted on the front of the machine and including spaced parallel limbs, rods slidable in said limbs and normally held in retracted positions, a casing supported by said rods and normally arranged for use in the capacity of a bumper for the machine, a roller journaled in said casing, a netting normally wound about the roller and having one end secured to said frame, means for automatically projecting said rods in advance of said frame and simultaneously unwind the netting from said roller incident to the release of said rods, and manually operable means for releasing said rods from a point adjacent the driver's seat of the machine.

3. An automobile attachment of the character described comprising a substantially U-shaped frame mounted at the front of the machine, spring pressed rods slidably mounted in said frame, a substantially semi-cylindrical casing carried by the forward ends of said rods, a roller journaled in said casing, a netting normally wound about said roller, and having one end secured to said frame, a pivoted latch mounted on the frame and normally engaging the casing to hold the rods retracted, and the casing positioned for use in the capacity of a bumper, means for operating said latch from a remote point, to release the casing and said rods, whereby the latter are automatically projected from the frame, and the netting unwound from said roller for the purpose specified, and means for limiting the sliding movements of said rods in either direction.

In testimony whereof we affix our signatures.

HENRY H. IRWIN.
WILLIAM ATTOR CARPENTER.